Oct. 24, 1933.  L. F. NENNINGER ET AL  1,932,374
MACHINE TOOL
Filed Feb. 20, 1930  2 Sheets-Sheet 2
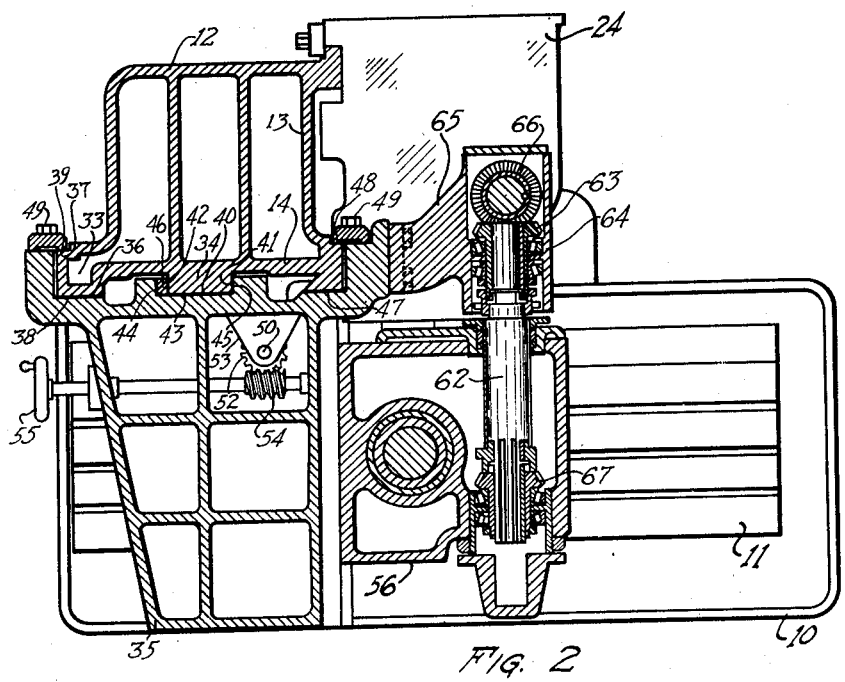
FIG. 2
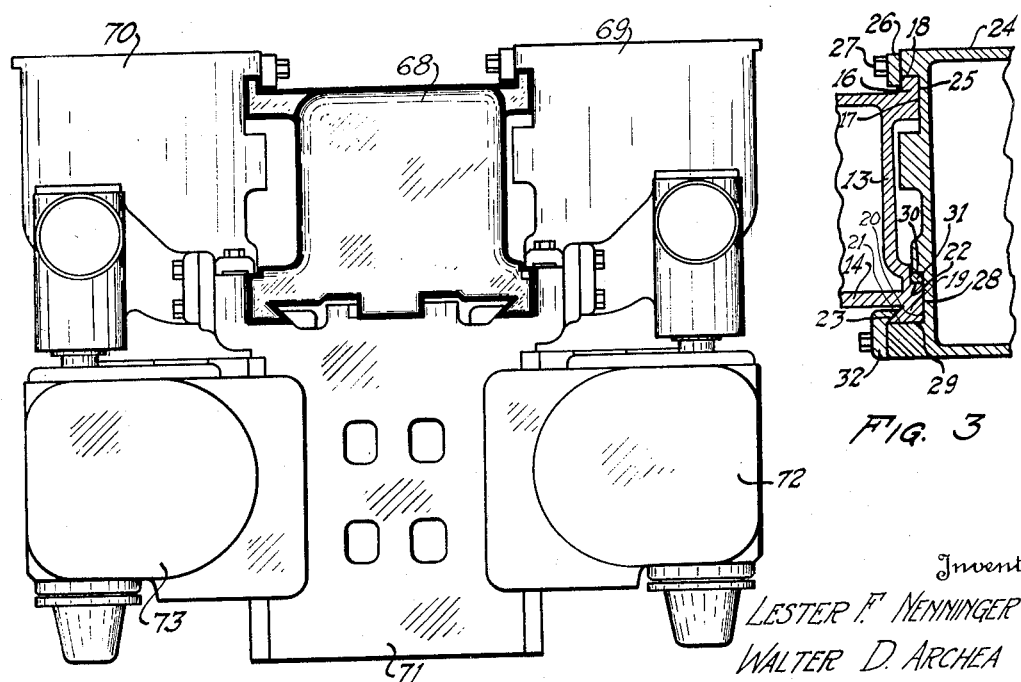
FIG. 4
FIG. 3
Inventor
LESTER F. NENNINGER
WALTER D. ARCHEA
By AHKParsons
Attorney Patented Oct. 24, 1933

1,932,374

UNITED STATES PATENT OFFICE 1,932,374

MACHINE TOOL

Lester F. Nenninger and Walter D. Archea, Cincinnati, Ohio, assignors to The Cincinnati Milling Machine Company, Cincinnati, Ohio, a corporation of Ohio Application February 20, 1930. Serial No. 430,060

12 Claims. (Cl. 90—15)

This invention relates to machine tools and more particularly to multiple spindle milling machines.

In present day production methods it is the preferred practice where feasible to use single purpose machines as distinguished from the commercially known general purpose machines. The controlling factor in the machining of an article with a single purpose machine is the number of surfaces that may be finished at one single operation. Therefore, the machine that is to be used must have a sufficient number of cutters, properly positioned to accomplish this purpose. It is thus apparent that the adaptability of a machine for a particular operation primarily depends upon the number and position of the cutters required to perform the given operation. It is therefore one of the principal objects of the present invention to produce a machine having a plurality of interchangeable cutter head units that may be assembled in the number required and in the various vertical and horizontal positions required with respect to the work support whereby the necessary number of machining operations may be performed in a single pass of the work with respect to the cutters.

Another object of the present invention is to provide a work support with a plurality of standard cutter spindle heads mounted in cooperative relation thereto which are adapted to be interconnected for joint operation.

A further object of this invention is to provide a milling machine with a plurality of interchangeable spindle units that may be positioned in accordance with the work surfaces to be machined whereby a plurality of such surfaces may be finished, simultaneously.

A still further object of this invention is the provision of an improved multiple spindle machine having a cutter head mounted on each of a plurality of faces of an upright column and guideways at the corner of the column formed by the intersection of the two faces, which will serve cutter heads mounted on both of the adjacent faces of the column.

An additional object of this invention is to provide an adjustable rail for supporting a cutter head in adjustable relation with respect to another cutter head and with respect to the work table of the machine.

Further objects and advantages of the present invention should be readily apparent by reference to the following specifications considered in conjunction with the accompanying drawings illustrative of one embodiment thereof, but it will be understood that we may make any modifications in the specific structural details hereinafter disclosed, within the scope of the appended claims, without departing from or exceeding the spirit of the invention.

In the drawings, in which like reference numerals indicate like parts:

Figure 2 is a sectional plan view on the line 2—2 of Figure 1;

Figure 3 is a partial sectional plan view as on the line 3—3 of Figure 1; and

Figure 4 is a plan view of a modification of the invention.

Figure 1:
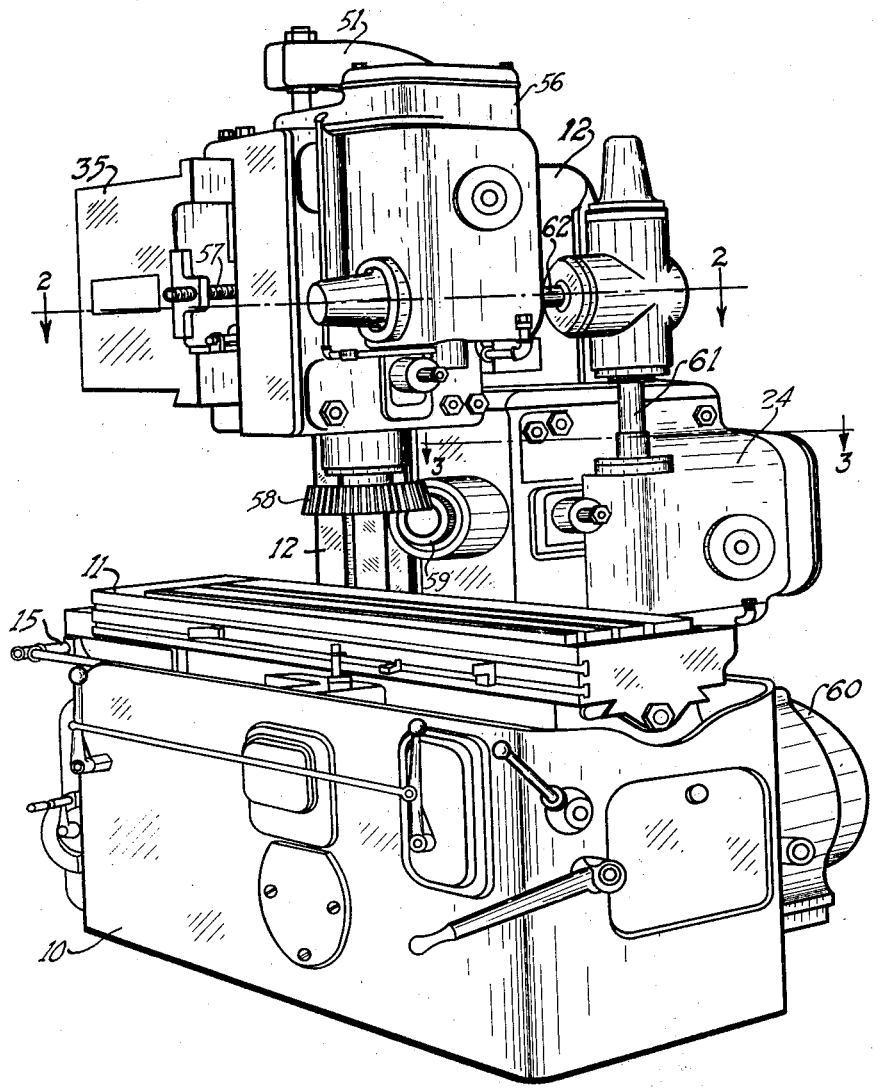
Figure 1 is an elevation of the machine showing one embodiment of the invention.

Referring to the drawings, the reference numeral 10 in Figure 1 represents the base of the machine upon which is slidably mounted the work table 11, which may be reciprocated by hydraulic means generally indicated by the numeral 15.

Adjacent to the bed 10 is the column 12 having standard guideways on its face 13 for mounting a standard cutter spindle head 24 having the driving shaft 61 extending therethrough which is adapted to be connected at either end with an actuator or with another driven member. Mounted upon guideways on the face 14 of the column is the adjustable rail 35 having standard guideways upon its vertical face for the reception of another standard cutter spindle head having a similar shaft 62 extending therethrough. Upon examination of the drawings it is seen that the guideways in the face 13 of the column and the vertical face of the rail 35 are in the same plane making it possible to interconnect the cutter spindles by simple means to be described hereafter for joint actuation. From this construction it is apparent that a desired number of standard cutter spindle heads may be mounted in cooperative relation with a work support and interconnected for joint actuation.

Referring to Figure 3, the face 13 has a guideway 16 consisting of the bearing surface 17 and the guide surface 18. At the intersection of the faces 13 and 14 there is formed a slideway 19 composed of the bearing surfaces 20 and 21 and the guide surface 22 which is normal to the bearing surface 20 and the beveled guide surface 23 which is at an angle to the bearing surface 21.

The spindle carrying head 24 is slidably mounted upon the guideway of the face 13 and is provided with a bearing surface 25 for cooperating with the surface 17 and also has the guide member 26 which engages the guide surface 18 and serves as a clamping member as well, by means of the bolt 27. The head 24 also has the bearing surfaces 28 and 29 for engaging the surfaces 20 and 21 of the face 13 and the guide surface 30 for cooperating with the surface 22 by means of the adjustable gib 31. The surfaces 22 and 29 serve as a long narrow guideway to prevent lateral movement of the head 24. There is also provided on the head 24, another guide and clamping member 32 which cooperates with the bevel guide surface 23. The members 26 and 32 prevent any movement normal to the face 13.

The face 14 of the column is provided with a pair of guideways 33 and 34. Adjustably mounted upon these guideways is the rail 35. Guideway 33 has the bearing surface 36 and the guide surface 37 for cooperating with the bearing surface 38 and the guide surface 39 of the rail. The guideway 34 has the bearing surface 40 and the guide surfaces 41 and 42 for co-operating with the bearing surface 43 and the guide surfaces 44 and 45 of the rail. The adjustable gib 46 is provided between the faces 42 and 44 to provide an adjusting means to compensate for wear. A bearing surface 47 and a guide surface 48 is provided on the rail for co-operating with the guide surfaces 21 and 22 which surfaces as previously described, also serve as guiding surfaces for the head 24. The rail may be clamped in any position of adjustment by the bolts 49.

The rail 35 may be moved up and down manually on the column 12 and there is provided for this purpose a screw 50 which is supported in the end of the overhanging arm 51 which is secured to the top of the column 12 and holds the screw against both longitudinal and rotative movement. A nut in the form of a worm wheel 52 is journalled in the rail for engagement with the screw 50. The worm wheel 52 is mounted between a pair of supports 53 which are integral with the rail 35, so that, upon rotation of the member 52, the rail 35 will be moved up or down. A worm 54 is journaled in the rail 35 and fixed against longitudinal movement, for engagement with the worm wheel 52, and a handle 55 is provided for rotating the worm.

The rail 35 is provided upon one of its vertical faces with guideways as before mentioned for supporting the spindle carrying head 56. The head 56 is manually adjustable on its guideways by the screw 57, fixed against longitudinal movement on the rail 35 by a fixed nut (not shown) carried by the head 56. The head 56 carries the rotating cutter 58 and it will be seen from the foregoing description that the cutter may be adjusted toward and from the table 11 or toward and from the cutter 59 carried by the spindle head 24.

The two cutters 58 and 59 are driven from the prime mover 60 which drives the shaft 61 through a telescoping connection (not shown). The shaft 62, for driving the cutter 58 is driven at one end by the bevel gear 63 journaled in the housing 64 carried by the arm 65 which is fixedly connected to the rail 35 for movement up and down therewith. In the housing 64 there is also journaled another bevel gear 66 which meshes with the bevel gear 63, the gear 66 being driven by the spline shaft 61. The shaft 62 has a spline connection with bevel gear 67 so that the head 56 may be moved back and forth without breaking the driving connection with the cutter 58. By means of these spline connections into the gear, the cutters 58 and 59 may be driven in any of their positions of adjustment. The spindle head 24 is provided with manual adjusting means similar to the head 56 and thus, manual means are provided for adjusting the cutters in any of their directions of movement.

A modification is shown in Figure 4 and in this modification the vertical column 68 is provided with guideways upon three of its faces. The spindle heads 69 and 70 are mounted upon opposite faces of the column, with guideways similar to those upon the face 13 of column 12. An adjustable rail 71 is mounted upon another face of the column 68, with guideways similar to those shown in the face 14 of the column 12, but the rail in this case is provided with longitudinal guideways upon its opposite vertical faces, for supporting an adjustable spindle head such as 72 and 73 upon each face. By this arrangement four cutter spindles are provided for relative adjustment with respect to each other and with respect to the work table.

What is claimed is:

1. In a milling machine having a bed, a slidable table thereon, a vertical column having a plurality of faces and guideways on each face, cutter spindle carrying means mounted on each face and slidable in the guideways thereof, each face having guideways individual to the spindle carrier mounted thereon and each face having additional guideways common to both spindle carriers.

2. In a machine tool of the class described a bed, a table slidably mounted thereon, a vertical column adjacent the bed and having a plurality of faces, a guideway formed on each face, cutter spindle carrying means mounted on each guideway, a slide formed by the intersection of two faces and having additional guiding means common to the spindle carriers on the two faces.

3. In a machine tool of the class described a bed, a table slidably mounted thereon, a vertical column adjacent the bed and having a plurality of faces, a guideway formed on each face, cutter spindle carrying means mounted on each guideway, a slideway formed by the intersection of the two faces and consisting of two bearing surfaces and a guide surface normal to one of them, said surfaces being common to the spindle carriers on the two intersecting faces.

4. In a machine of the class described a bed, a table slidably mounted thereon, a vertical column adjacent the bed and having a plurality of faces, a guideway formed in each face, cutter spindle carrying means mounted on each guideway, a slideway formed by the intersection of the two faces consisting of a bearing surface, a guide surface pertinent to each face, said bearing surfaces and one guide surface being common to the spindle carriers mounted on each face and the other guide surface co-operating with the spindle carrier of the adjacent face.

5. In a milling machine having a bed and a table slidably mounted thereon, a vertical column adjacent the bed and having a plurality of faces, a guideway formed on each face, cutter spindle carriers mounted on each guideway, a slideway formed by the intersection of the two faces and consisting of two bearing surfaces, a guide surface normal to one of the bearing surfaces and a bevel guide surface, said bearing surfaces and normal guide surface being common to the carriers on the intersecting faces and said bevel guide surface co-operating with only one of said carriers.

6. In a milling machine having a bed, a table slidably mounted on the bed, a column adjacent the bed and having a plurality of faces, one face having a plurality of guideways and spindle carrying means mounted thereon, another face having a single guideway and spindle carrying means mounted thereon, said faces forming by their intersection a slideway common to both of said means.

7. In a milling machine having a bed, a table slidably mounted thereon, a column attached to the bed and having a plurality of faces, spindle carrying means mounted on each face, each face having slideways for its respective spindle carrier for preventing lateral movement thereof, and other guiding surfaces on one face common to both of said means.

8. A column for a machine tool having a plurality of faces angularly related to one another, guideways extending longitudinally of each face, a slideway formed by the intersection of two of said faces, an adjustable spindle carrier mounted on each face and having surfaces co-operating with the guideway of the respective face on which it is mounted, said slideway having guide surfaces common to and co-operating with other guide surfaces on each of said spindle carriers.

9. A milling machine having a support, a translatable element carried thereby, a column associated with said support, a rail adjustably mounted on the column, said column and rail having similar shaped guideways thereon but angularly related to one another, a plurality of similar spindle carrier units interchangeably attachable to either of said guideways, said guideways lying in a common plane whereby said units may be serially connected for joint actuation and additional guide surfaces on the column cooperating with a portion of the carrier guideway and extending parallel thereto for guiding said rail.

10. A milling machine having a bed, a table reciprocably mounted thereon, a column adjacent the side of the table, a guideway formed on one face of the column, a rail reciprocably mounted on another face of said column in overhanging relation to the table, a longitudinal guideway formed on said rail and lying in the plane of the first named guideway, like spindle carriers mounted on each of said guideways, each carrier having a splined driving shaft extending parallel to its respective guide, said shafts lying in the same plane, and means lying in said plane for coupling said shafts for joint actuation whereby said carriers may be interchangeably mounted on said guideways for simultaneous actuation.

11. A milling machine having in combination a bed, a work table mounted on the bed, means to support a plurality of cutter spindles in co-operative relation to the table for vertical and transverse adjustment relative thereto including a column, a rail adjustably mounted on the column, co-planer faces formed in the column and rail, like guideways formed on said faces, a plurality of like spindle carriers, a spindle driving shaft splined on each carrier, means to mount the spindle carriers on said guideways whereby the shafts will lie in the same plane for joint operation and the carriers may be adjusted in a plurality of directions relative to the table without interrupting the joint operation thereof and additional guide surfaces on the column cooperating with a portion of the carrier guideway and extending parallel thereto for guiding said rail for vertical adjustment.

12. A milling machine having a bed, a work table reciprocably mounted on the bed, a column, a rail mounted on the column in overlying relation to the table, co-planer guideways formed on the rail and column, a spindle carrier mounted on each of said guideways, a spindle journaled in each carrier, a spindle driving gear journaled in each carrier, splined shafts operatively coupled with each gear, said shafts lying in the same plane, a bracket fixed to the rail and bevel gears journaled in the bracket, said gears having splined bores, one of said splined shafts extending to one of said bevel gears to permit adjustment of one carrier relative to the table and adjustment of the rail relative to the table, the other shaft being fixed to the remaining bevel gear and extending through the remaining carrier to permit adjustment thereof transversely of the table.

LESTER F. NENNINGER.
WALTER D. ARCHEA.